T. J. LITLE, Jr.
GLOBE OR SHADE FOR GAS LAMPS.
APPLICATION FILED AUG. 15, 1908.
961,504.
Patented June 14, 1910.
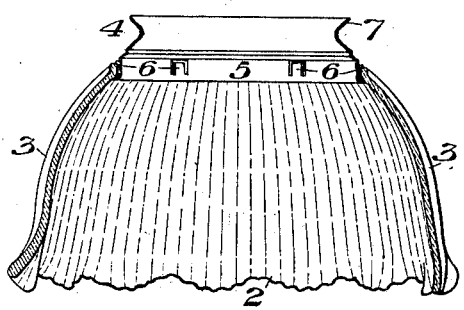
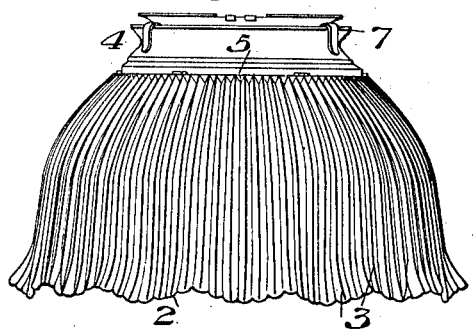
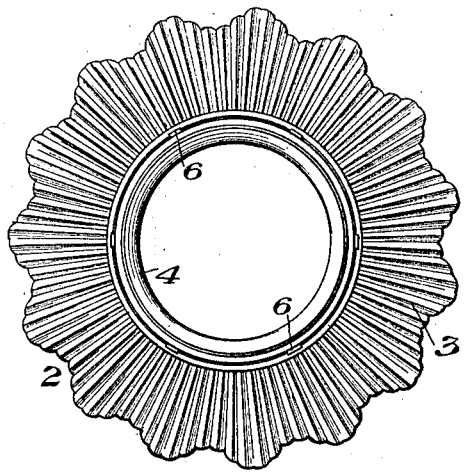
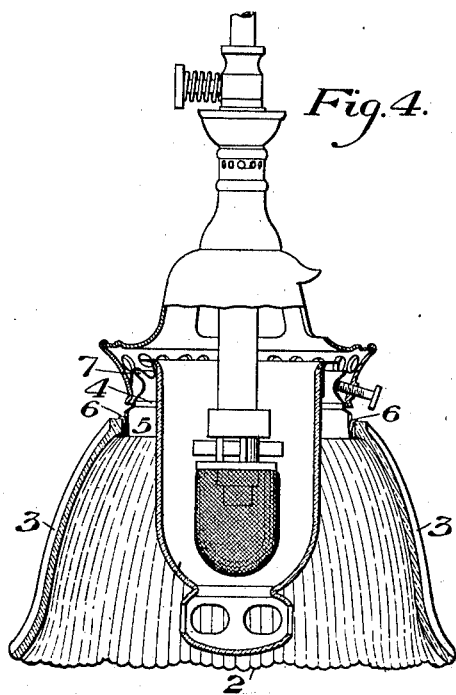

UNITED STATES PATENT OFFICE.

THOMAS J. LITLE, JR., OF WOODBURY, NEW JERSEY, ASSIGNOR TO WELSBACH LIGHT COMPANY, OF GLOUCESTER CITY, NEW JERSEY, A CORPORATION OF NEW JERSEY.

GLOBE OR SHADE FOR GAS-LAMPS.

961,504.      Specification of Letters Patent.     Patented June 14, 1910.

Application filed August 15, 1908. Serial No. 448,643.

*To all whom it may concern:*

Be it known that I, THOMAS J. LITLE, Jr., of Woodbury, Gloucester county, New Jersey, have invented a new and useful Improvement in Globes or Shades for Gas-Lamps, of which the following is a full, clear, and exact description, reference being had to the accompanying drawings, forming part of this specification, in which—

Figure 1 is a vertical cross section showing one form of my shade; Fig. 2 is a top plan view of the same; Fig. 3 is a side elevation showing the globe-holding section of the burner in place; and Fig. 4 is a vertical section, partly in elevation, showing the entire burner in position, with the usual chimney.

My invention relates to glass shades or globes for gas lamps, particularly inverted gas lamps. It also applies especially to glass shades having thick upper or neck portions which are secured to the burner. These thick upper portions are necessary on glass shades or globes having ornamental or light-diffusing or deflecting portions; for example, in the well-known holophane glass shades prismatic ribs are employed which necessitate a considerable thickness in the neck portion of the glass. The difficulty with such shades has been that as the upper part or neck was nearer to the heat currents than the lower part, this upper part would become hotter than the lower part and the shades would crack, owing to the different expansion in the different portions. This has been a serious difficulty, especially with glass shades or globes having these thick upper portions. Another reason for this cracking is that the glass neck has usually been held to the burner by screws spaced apart around the burner and which are screwed in to engage the glass neck, which is usually outwardly flanged. As the metal burner becomes heated, the coefficient of expansion being different for metal and glass, this causes a further tendency to break the shade. These screws also convey heat to the glass at separated points, which points naturally become hotter than the portions of glass between them, thus increasing the tendency to crack the glass.

My invention is designed to overcome this difficulty, which of course is peculiarly present in inverted lights, owing to the rising heat currents acting upon the burner and shade neck.

It consists in providing an inverted glass shade or globe having an upper hole which is larger in diameter than that of the shades as now made, and which is too large to engage the burner; and in securing to the glass shade with this hole an extension metal neck.

In the drawings, in which I show a preferred form of my invention, 2 represents an inverted glass shade or globe having prism projections 3 thereon. This shade is shaped with an enlarged hole in its upper part within which is secured the metal neck 4. I have shown this sheet metal neck as having a lower flange 5 fitting against the inner portion of the shade, the intermediate portion of the neck having clips 6 which may be bent or sprung out to hold the shade in place. The neck is preferably so secured to the glass shade that the parts will be sold and shipped as one article, but the metal neck may be easily removed, if desired. The narrower portion of this metal neck, as shown, is preferably provided with an outwardly flared flange 7, the burner screws or other fastening means on the burner engaging this flange to suspend the entire article.

In the use of the device the heat currents rising from the mantle or other burner will heat the metal neck, but only a small amount of this heat will be communicated to the upper part of the glass shade, which is spaced away from these heat currents. The ordinary joint between the metal and the glass will conduct only a small portion of the heat to the glass, because the hole in the glass is not accurately circular.

Inasmuch as the metal neck is inclosed within the frame of the burner and the upper part of the glass is wholly outside of the burner frame, there is much better chance for radiation of heat from the glass than there is if the glass neck is inclosed within the burner, as ordinarily.

Owing to the use of the metal neck instead of a glass neck, the interior diameter of the hole in the neck is much larger in my shade than it would be in the glass shade, since the glass is much thicker than the metal. The size of these burners having been fixed by trade usage, the glassware is, of course, made to fit the burners; and especially in the case of ornamented shades with prisms or other projections thereon the upper thick neck is necessarily close to the heat, the opening being relatively small. Also the space between this hole in the glass neck and the inner chimney is quite small, so that the glass neck receives a great deal of heat, there being little room for the passage of cool air currents between them. Furthermore, the user or party installing the fixtures is very liable to screw up the retaining screws for the shade too tightly, thereby tending to crack the glass neck. This liability is done away with in my device, since of course the metal neck will not crack under pressure of the screws.

Many variations may be made in the form and arrangement of the glass shade and the metal neck, and their connection without departing from my invention.

I claim.—

1. As a new article of manufacture, a glass globe or shade having integral projections for acting upon the light rays, and a metal neck secured within the upper hole of the shade and an outwardly extending flange on the upper portion of the neck adapted to be engaged by shade holding members of a burner; substantially as described.

2. As a new article of manufacture, a glass globe or shade having integral projections for acting upon the light rays, and a metal neck secured within the upper hole of the shade, said metal neck having an outwardly projecting circular flange of smaller diameter than the hole in the glass shade; substantially as described.

3. As a new article of manufacture, a neckless glass globe or shade having an upper hole, a metallic neck secured within the hole and projecting above the glass body, the metallic neck having a projecting portion, and locking members projecting from the said neck, the upper edge of the glass body being held between the projecting portion of the neck and its locking members, substantially as described.

4. As a new article of manufacture, a neckless glass globe or shade having an upper hole, a metallic neck secured within the hole and projecting above the glass body, the metallic neck having a projecting portion, and locking members formed integrally with and projecting from the said neck, the upper edge of the glass body being held between the projecting portion of the neck and its locking members, substantially as described.

In testimony whereof, I have hereunto set my hand.

THOMAS J. LITLE, Jr.

Witnesses:
RICHARD B. WASHINGTON,
JOSEPH H. JOHNSON.